Nov. 27, 1956  W. E. MARTIN  2,772,008
METHOD OF SPOTTING PIVOTAL CENTERS FOR SWINGING LINK
STRUCTURE OF FOLDING GOOSENECK TRAILER HITCH
Filed June 27, 1952
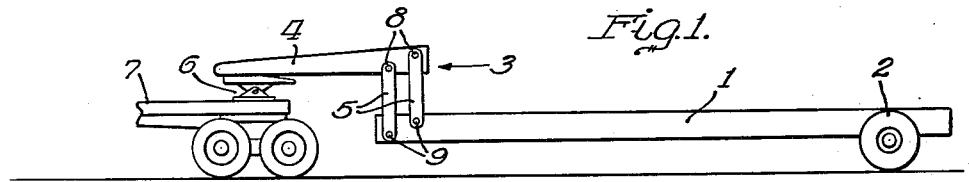
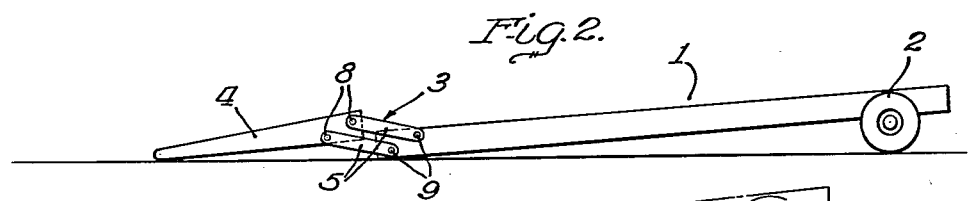
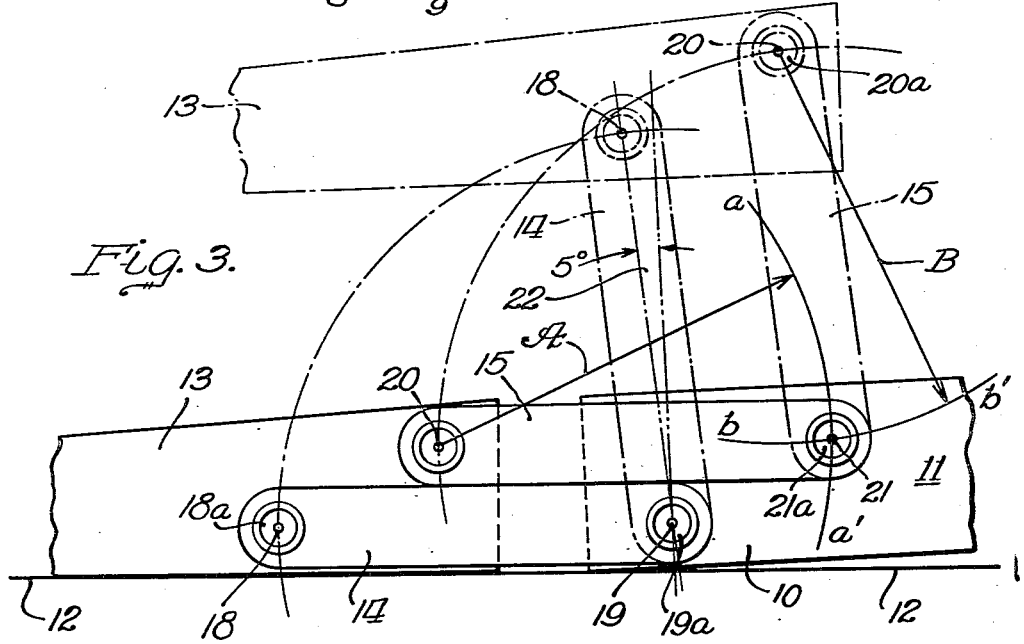
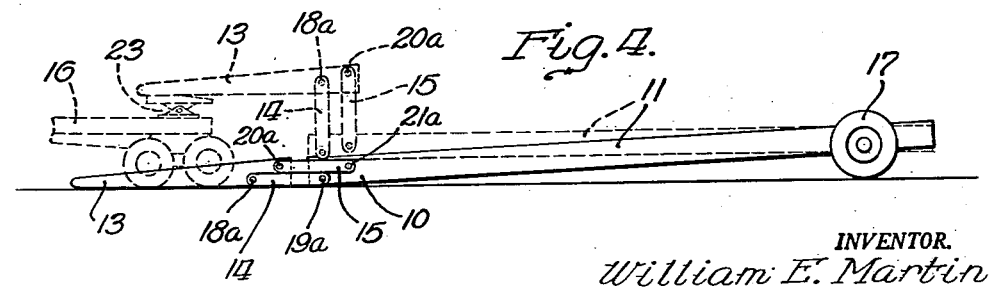
INVENTOR.
William E. Martin
BY
Eberhard C. Wetter
Atty.

United States Patent Office 2,772,008
Patented Nov. 27, 1956

2,772,008

METHOD OF SPOTTING PIVOTAL CENTERS FOR SWINGING LINK STRUCTURE OF FOLDING GOOSENECK TRAILER HITCH

William E. Martin, Kewanee, Ill.

Application June 27, 1952, Serial No. 295,972

4 Claims. (Cl. 214—152)

This invention relates to the method of locating the pivotal centers of the links of each link group connected between the bed of a trailer and the hitch tongue thereof to thereby establish a given relationship between the hitch and bed when the hitch is elevated into trailer towing position or when the hitch is lowered to the ground for trailer bed loading operation.

This application in general comprises a continuation-in-part of my copending application Serial No. 38,840 filed July 15, 1948, and relating to a Foldable Trailer Hitch, issued as Patent No. 2,611,496, on September 23, 1952.

One of the objects of the present invention is to provide a method for locating the pivotal centers of the links connecting the hitch tongue with a trailer bed to eliminate clearance slots at certain of such pivotal locations and in one or the other of the link connected structures.

Another object of the present invention is to provide a method for locating link pivotal centers to permit full ground contact of the hitch tongue ahead of the trailer bed by swinging links carried upon said bed, and to provide such a structure with fixedly located pivot pins in both the tongue and bed.

Other objects and advantages relating to the method of the present invention shall hereinafter appear in the following detailed description of the invention having reference to the accompanying drawings forming a part of this specification.

In the drawings:

Fig. 1 is a side elevational view of a trailer arranged in towing position and connected with a tractor, this trailer representing, by way of example, a conventional construction of trailer not incorporating the principles of the present invention and using a true parallel link and pivotal connecting mechanism between the bed and hitch tongue operable about fixed pivotal axes devoid of clearances adjacent the pivotal mounting locations;

Fig. 2 illustrates the relative positions of the trailer structures of the Fig. 1 trailer when the trailer is disconnected from the tractor and with the trailer tongue and bed lowered to the ground;

Fig. 3 illustrates a trailer construction incorporating the method of the present invention as employed in spotting the axial locations of the pivotal means associated with the links of each link group that connect the hitch tongue with the trailer bed; and Fig. 4 illustrates the workings of the hitch tongue of a trailer constructed in accordance with the method used and illustrated in Fig. 3 for locating the pivotal connections of the links upon the hitch tongue and bed of the trailer.

Referring to Figs. 1 and 2, and by way of explanation, the conventional trailer here shown by way of example comprises a load carrying bed 1 having a rear wheel carriage 2 and a forward hitch means 3 consisting of a hitch tongue 4 with swingable parallel link means 5 connecting the tongue with the adjacent end of the bed 1. The hitch means 3 is arranged for connection with a fifth wheel 6 mounted upon a towing vehicle or tractor 7. This construction has a hitch means 3 which is of the foldable gooseneck type and the parallel link means 5 are here carried upon pivot pins or shafts 8 and 9 fixed in no clearance relation with respect to their connections with the hitch tongue and the bed respectively.

When a trailer of this construction is disconnected from the towing vehicle 7 to lower the bed 1 to the ground and to collapse the hitch means 3, the latter will assume the undesirable position shown in Fig. 2 wherein the hitch tongue 4 cannot be reclined in flat contact with the ground. This is highly objectionable in units where the tongue provides a bed loading ramp. This is due to the fact that there are no actual clearances for play at the pivotal shaft locations at 8 and/or 9 nor are the pivotal mountings in the tongue or bed provided with clearance slots of the character used in my copending application Serial No. 38,840 hereinbefore referred to.

To overcome this objectionable situation and to eliminate the use of one or more slots at the pivotal mounting locations of the connecting links of a foldable gooseneck hitch means, the present invention employs the method best illustrated in Fig. 3, to create a close approach to a parallel link mechanism but so arranged as to obtain given terminal positions for the tongue.

The end 10 of a trailer bed 11 is shown as resting upon the ground or other reference surface 12. The hitch tongue 13 is also shown as positioned flatly upon the surface 12 and at a given spaced distance ahead of the bed end 10. Several groups of links such as the links 14 and 15 are used to connect the tongue and bed with such links being of a length as to establish a given vertical separation between the bed and hitch tongue for connection with a tractor such as 16 with bed 11 raised into transportable position and rendered mobile upon the connected rear wheel carriage 17, see Fig. 4.

With the bed 11 and hitch tongue 13 in contact with the ground and in selected loading positions, the first and second centers 18 and 19 for pivot pins 18a and 19a for the first link 14 may be established generally horizontally upon the tongue and bed respectively as shown in Fig. 3. This brings about a one link reference connection between members 11 and 13.

Then a third pivotal center 20 for first pivot pin 20a can be spotted in rearwardly and upwardly spaced relation with respect to the center 18 on the tongue 13 to fix a first connective position for the second link 15. When this is done, an arc a—a' may be described upon the adjacent end 10 of the bed 11, the arc having a radius A equal to the pivotal length of the link 15 from point 20 to its other pivotal center 21.

With this accomplished, the tongue 13 can now be bodily raised into a given elevated position as shown in dot and dash lines in Fig. 3. This position of the tongue may be selected as best determined by conditions of operation and as desired in relation to the bed 11. The elevation of the tongue 13 is guided by the swinging of link 14 on its center 19.

As one example, tongue 13 may be positioned with a 5 degree forward tilt or angle of the links with respect to a vertical line to the surface of the bed as shown at 22 to give the hitch tongue a slight horizontal downward pitch and with the links 14 and 15 of equal lengths. With the tongue 13 so raised and located, a second arc b—b' upon center 20 may now be described with a radius B equal to the length of link 15 upon the forward end 10 of the bed 11 to intersect arc a—a'. The intersection of the arcs a—a' and b—b' determines the location of the fourth pivotal center 21 for the pivot pin 21a for the pivotal connection of link 15 with bed 11.

With this method the fourth pivotal center is located through the use of the connected link mechanism and from the actual terminal positions of the tongue in relation to the bed and/or the ground. The tongue will therefore, assume each of the selected terminal locations established by the present method of locating the link shaft pivots, and the actual intermediate bodily shifting of the tongue with respect to the bed will follow through according to the link guided path of the respective pivotal centers, the links using the bed connections as the fulcrums and the hitch tongue connections as the tongue manipulating swingable mountings.

In Fig. 4, the full line illustration indicates the relationship of the folding gooseneck parts when the trailer is brought to loading position upon the ground while the dotted line position shows the same trailer in lifted relation with the hitch tongue elevated to connect with a fifth wheel 23 of the towing vehicle or tractor 16. Here the tongue 13 is flat upon the ground and in ideal position when as a loading ramp for the trailer bed.

The trailer in Fig. 4 is constructed according to the use of the pivotal spotting method to locate the pivots for the links for operation upon non-clearance fixed axes and without slotted mountings, thereby obtaining a fully reclined hitch tongue by the method of predetermining the pivotal center locations of the swingable links in relation to the bed. In addition, a given selected raised position is obtained for mobile transportation of the trailer.

Contemplated changes in the method herein employed may be possible without deviation from the original concept of the invention. Any such deviations or modifications shall, however, be governed by the breadth and scope of the appended claim or claims:

What I claim is:

1. In a folding gooseneck type trailer having a vertically movable hitch tongue joined with the trailer bed through pairs of swingable links with apertured ends pivotally carried upon shafts supported upon said tongue and bed respectively, the method of spotting the four pivotal centers for the pivot shafts for said pairs of links to establish predetermined raised and lowered positions for said hitch tongue with respect to said bed which consists of placing the head end of the bed upon the ground, disposing the hitch tongue flat upon the ground beyond the head end of the bed and in spaced relation thereto, selecting a given link length for both links having equal predetermined spacings between the end shaft apertures therein respectively, using one such apertured link as a drill guide to longitudinally locate the positions of the shaft openings opposite said link apertures for drilling one pair of first and second pivotal shaft centers through the bed and tongue respectively, using another such apertured link to locate a drill to form a third offset pivotal center upon the hitch tongue for a shaft spaced rearwardly and upwardly from the first pivotal center on said tongue and in true parallelogram fashion, then striking an arc coincident with the center of the shaft aperture at the free end of said other link and upon said bed with a radius equal to the link length between its end apertures from the said third offset shaft center, then bodily lifting said tongue upwardly into its predetermined raised location by swinging the same upon a circular path guided by the link connecting the first two pivotal link center shaft locations, and then striking a second arc coincident with the center of the shaft aperture at the free end of said other link and of a radius equal to the link length from the third pivotal center of said tongue to intersect the first arc on said bed, and locating the fourth shaft for said other link upon a pivotal center coincident with the intersection of said two link described arcs.

2. In a folding gooseneck type trailer having a vertically movable hitch tongue joined with the trailer bed through pairs of swingable links pivotally connected with shafts upon said tongue and bed respectively, the method of spotting the four pivotal centers for said pairs of links to anticipate predetermined raised and lowered positions of said hitch tongue with respect to said bed which consists of disposing the head end of the bed in a given angular relation with respect to the ground, positioning the hitch tongue in a given and bodily lowered relation with respect to the ground and in a selected position spaced beyond said trailer bed, selecting a first link of a given length with shaft receiving openings therein to spot first and second pivotal centers on said bed and tongue respectively through said openings to establish one link location and connection between said bed and tongue, selecting a second link of a given length with shaft receiving openings therein and fixing a third pivotal center upon said hitch tongue opposite one such opening, then striking an arc through the free link end shaft opening and from said third pivotal center upon the bed with the arc having a radius equal to the length between the centers of the shaft openings of said second link, then bodily swinging said hitch tongue into a selected raised position by swinging the tongue upon said first link, then striking another arc having a radius equal to the length between the centers of the shaft openings in said second link and from the third pivotal hitch tongue shaft center and upon said bed intersecting said first arc on the bed, and locating the fourth pivotal center for the second link shaft connection with the bed coincident with the location of the intersecting arcs as described through said link shaft openings in said other link.

3. In a folding gooseneck type trailer having a bed and a hitch tongue with link groups connected between the tongue and bed, each group comprising a pair of spaced links each pivotally carried upon shafts connected with the tongue and bed respectively, the method of spotting the pivotal centers for such link shafts of each group to dispose the hitch tongue in predetermined raised and lowered positions with respect to the bed which consists of placing the adjacent bed end in a selected fixed and angular position upon a reference surface, placing said hitch tongue in a predetermined desired lowered position with respect to the bed end upon said reference surface, spotting a first pair of pivotal centers generally horizontally upon the tongue and bed coincident with the spacing between said shaft locations on said link, establishing a third pivotal center on said hitch tongue spaced vertically and in staggered relation with respect to said first hitch tongue center and coincident with one of the shaft location centers of another link, then striking an arc upon said bed having a radius equal to the distance between the shaft centers of said second link using the third pivotal shaft center as a fulcrum for said link, then bodily shifting the hitch tongue into a predetermined raised location as pivotally guided by said first link about its respective shaft pivots on the tongue and bed, then striking a second arc upon said bed having a radius equal to the distance between shaft locations on the second link about the third pivotal center to intersect said first arc, and then spotting the location of the fourth pivotal center at the arc intersections as a pivotal shaft center for the remaining free end of said second link.

4. In a folding gooseneck type trailer having a load hauling bed and a hitch arranged for bodily shifting movement relatively to said bed and between bed transporting position and bed loading position, said links being spaced in vertically offset relation in both positions and pivotally carried upon fulcrum shafts supported by said bed and hitch respectively, the method of locating the link shaft centers on said bed and hitch respectively which comprises drilling three shaft openings for said links into said bed and hitch and in true parallelogram arrangement, assembling said shafts and links at said triplet parallelogram locations, and using the one free link end to swingably establish a fourth shaft center location by describing intersecting arcs from a point coincident with the shaft center at the swingable free end of said one link, said arcs being described by said link from the hitch lowered and hitch raised positions respectively and with said other link functioning as a positive guide for the connected units between hitch lowered and hitch raised locations, and drilling the fourth shaft opening upon a center coincident with the point of intersection of said described arcs.

References Cited in the file of this patent

UNITED STATES PATENTS

| | | |
|---|---|---|
| 2,452,789 | Pike | Nov. 2, 1948 |
| 2,611,496 | Martin | Sept. 23, 1952 |